(12) United States Patent
Lim et al.

(10) Patent No.: US 6,484,749 B1
(45) Date of Patent: Nov. 26, 2002

(54) FIRE-RESISTANT FLANGE SPACER

(75) Inventors: Michael Lim, Marlton, NJ (US); Richard L. Davis, Montgomery, TX (US)

(73) Assignee: Coltec Industrial Products, Inc., Charlotte, NC (US)

( * ) Notice: Subject to any disclaimer, the term of this patent is extended or adjusted under 35 U.S.C. 154(b) by 0 days.

(21) Appl. No.: 09/708,260

(22) Filed: Nov. 8, 2000

Related U.S. Application Data (63) Continuation-in-part of application No. 09/352,569, filed on Jul. 13, 1999, now Pat. No. 6,202,981.
(60) Provisional application No. 60/106,523, filed on Oct. 31, 1998.

(51) Int. Cl.[7] .............................. F16L 35/00; F16J 15/08
(52) U.S. Cl. ...................... 137/375; 251/151; 277/602; 277/627; 277/939
(58) Field of Search ................................. 251/143, 147, 251/148, 151; 137/375; 285/351, 368, 408, 405; 277/602, 603, 608, 627, 939

(56) References Cited

U.S. PATENT DOCUMENTS

| | | | |
|---|---|---|---|
| 2,740,423 A | | 4/1956 | Stillwagon |
| 2,994,342 A | | 8/1961 | Stillwagon |
| 3,367,624 A | * | 2/1968 | Scaramucci ................. 251/148 |
| 3,409,268 A | * | 11/1968 | Gachot ....................... 251/148 |
| 3,659,822 A | * | 5/1972 | Nagy ..................... 251/148 X |
| 3,910,552 A | * | 10/1975 | Hills et al. .................. 251/148 |
| 4,079,746 A | | 3/1978 | Killian |
| 4,101,112 A | * | 7/1978 | Conners et al. ............. 251/148 |
| 4,121,859 A | * | 10/1978 | DeMey, II .................... 285/93 |
| 4,221,307 A | * | 9/1980 | Peterson ................. 251/328 X |
| 4,224,961 A | * | 9/1980 | Schnabel ..................... 137/375 |
| 4,234,638 A | * | 11/1980 | Yamazoe et al. ........ 277/650 X |
| 4,274,436 A | * | 6/1981 | Smith ...................... 137/375 X |
| 4,288,105 A | * | 9/1981 | Press ......................... 285/93 X |
| 4,399,833 A | * | 8/1983 | Holtgraver .............. 251/305 X |
| 4,505,289 A | * | 3/1985 | Wilson .................... 251/148 X |
| 4,527,771 A | * | 7/1985 | Yeary ..................... 251/305 X |
| 4,552,386 A | | 11/1985 | Burchette |
| 4,691,740 A | | 9/1987 | Svetlik et al. |
| 4,751,938 A | * | 6/1988 | Kerns et al. ............. 251/148 X |
| 4,832,079 A | * | 5/1989 | Nielson .................... 251/148 X |
| 4,919,391 A | * | 4/1990 | Kemp ......................... 251/148 |
| 5,029,811 A | * | 7/1991 | Yamamoto et al. ..... 251/306 X |
| 5,171,041 A | | 12/1992 | McMillan et al. |
| 5,174,615 A | | 12/1992 | Foster et al. |
| 5,361,801 A | * | 11/1994 | Kerpan et al. .......... 251/148 X |
| 5,362,115 A | | 11/1994 | Carr |
| 5,421,594 A | * | 6/1995 | Becerra ....................... 277/608 |
| 5,527,047 A | * | 6/1996 | Waterland, III ......... 277/627 X |
| 5,660,417 A | * | 8/1997 | Reeves ......................... 285/93 |
| 5,685,520 A | * | 11/1997 | Velan ...................... 251/305 X |
| 6,092,811 A | * | 7/2000 | Bojarczuk et al. .......... 277/627 |
| 6,202,981 B1 | * | 3/2001 | Davis et al. ................. 251/143 |

FOREIGN PATENT DOCUMENTS

| | | |
|---|---|---|
| EP | 0 292 659 | 11/1998 |
| FR | 2 580 762 A | 10/1986 |
| GB | 233488 | 5/1925 |

OTHER PUBLICATIONS

Dec. 22, 1999, International Search Report.

* cited by examiner

*Primary Examiner*—John Rivell
(74) *Attorney, Agent, or Firm*—Cummings & Lockwood LLC (57) ABSTRACT

A composite flange spacer for articulation between a fluid control assembly and a pair of pipe flanges comprising a fire-resistant, relatively non-compressible, layer sandwiched between a pair of fire-resistant compressible layers.

6 Claims, 7 Drawing Sheets

FIRE-RESISTANT FLANGE SPACER

RELATED APPLICATIONS

This application is a Continuation In Part application of U.S. patent application Ser. No. 09/352,569, filed on Jul. 13, 1999 now U.S. Pat. No. 6,202,981, which claims priority to U.S. provisional patent application serial No. 60/106,523, filed on Oct. 31, 1998, the disclosures of which are incorporated herein by reference.

BACKGROUND

The present disclosure relates to joined pipe flanges and, more particularly, a fluid control device secured between pipe flanges. Even more particularly, the present disclosure relates to a fluid control assembly adapted to be secured between two pipe flanges and including flange spacers.

Pipes and fluid control devices, such as valves and pumps, are common in the utility, refinery, manufacturing, chemical and petrochemical industries for transporting fluids. Pipes often include attachment flanges at their ends, and fluid control devices are secured between the pipe flanges, usually using bolts. In such cases it is desirable that stresses be applied to the pipe flanges evenly, that the fluid control device is properly aligned with the pipes, and that the bolts are correctly torqued or loaded.

For example, fiberglass reinforced pipe ("FRP") as well as other plastic piping systems and components provide many industries with a corrosion-resistant, less costly replacement for metal piping. However, since plastic piping is, by its nature, not as strong as metal piping, flanges of plastic piping may be more susceptible to cracking upon uneven loading or rotation of the flanges.

Improper alignment of the fluid control device with the pipes could interfere with operation of the fluid control device. Butterfly valves, for example, typically include a generally cylindrical body which is connected into a pipe line by being clamped between two pipe flanges. The valve body has a flow-way therethrough and a valve element is mounted in the flow-way for movement from a closed valve position to an open valve position. In the open valve position, the valve element can extend out of, and beyond the valve body. Thus, correctly aligning the valve with the pipes is necessary to prevent interference between the valve element and the pipe flanges during movement of the valve element between the closed and open positions.

In addition, bolt creep and improper loading or torquing of bolts joining the pipe flanges to the fluid control device can result in a loosening or weakening of the joint. Bolt creep is a condition wherein bolts naturally loosen over time due to machine vibration and thermal expansions and contractions, for example. Improper loading can occur due to inaccurate torquing of bolts holding flanges together.

In many industries it is important not only to prevent leakage of materials from pipes at the pipe-flange/fluid-control device interface under normal operating conditions, but also to reduce the possibility of leakage of materials after exposure to abnormal conditions, such as high heat or flames. In some industrial applications leakage of materials may eventuate hazardous conditions or catastrophic failures. It is therefore a real concern that seals be maintained during such abnormal conditions so that plant personnel can shut down the system in which such seals are employed.

Thus, what is desired is a fluid control assembly for clamping between pipe flanges that provides reduced flange stresses, provides effective sealing under abnormal conditions such as fire, and easy alignment with the pipes. What is also desired is a fluid control assembly wherein bolt creep is reduced or eliminated, and wherein bolt loading is made easy and convenient, both in the assembly of the joint and in the maintenance of the joint.

SUMMARY OF DISCLOSURE

Accordingly, the present disclosure provides a fluid control assembly including a fluid control device and a relatively non-compressible flange spacer. The fluid control device has a main body, an annular shoulder extending from the main body, and a tubular, relatively compressible liner extending out of the body through and axially beyond the shoulder. The relatively non-compressible flange spacer is positioned on the shoulder and extends from the main body to between an end of the shoulder and an end of the liner, when the liner is in a non-compressed state. Whereby, the flange spacer prevents a pipe flange secured to the fluid control device from bending, or "rotating", when clamped to the device, thereby substantially eliminating uneven stresses on the pipe flange. The flange spacer also allows the liner to be compressed, but not over-compressed and damaged, such that the compressed liner provides a fluid-tight seal between the fluid control device and the pipe flange, yet does not interfere with movement of a valve member within the liner.

According to one preferred embodiment, the flange spacer is a composite assembly comprising compressible fire-resistant material (that is, resistant to deformation when subjected to a flame and the heat associated with typical industrial fires), such as flexible graphite, bonded to a relatively non-compressible material, such as a solid metal. The compressible fire-resistant material is preferably bonded along the major surfaces of the flange spacer that are intended for contact with the flanges of the pipe and the fluid control assembly. For example, flexible graphite may be bonded to each major face of a carbon steel ring to form a three-ply laminate assembly that acts as the flange spacer. Preferably, the compressible fire-resistant material is a low-density material which increases its density as its thickness decreases. The increase in density creates a homogenous gasket and eliminates permeating fluid from escaping through its wall. That is, the compressible fire-resistant material preferably acts as a gasket. In a preferred application, a composite flange-spacer is placed about each shoulder of the fluid control assembly and is articulated between the valve body and the pipe flange. When flexible graphite is employed, it is preferred that the graphite faces are compressed from a nominal thickness to approximately half its nominal thickness after final compression. Preferably, a mating pipe liner is simultaneously compressed against the mating valve liner in order to create a face seal for the process fluid. In the event of a fire, while the mating valve liner and pipe liner may soften, burn or disintegrate (depending on the exposure time), the composite flange spacer will remain and the flexible fire-resistant material will retain its seal with the valve body and mating pipe-flanges (by impinging on the same). This prevents process fluid from escaping into the environment. Thus, while the plastic materials may burn or disintegrate, the seal is maintained, at least to an extent that plant personnel can have time to shut down any process employing such fluid control assembly, or to drain the pipes connected with such fluid control assembly.

As would be understood by one of ordinary skill in the art, the invention described may employ any valve type, in particular, any flanged style valve such as, but not limited to, a gate, globe, ball, plug and butterfly. Further, as would be understood by such person, the composite flange spacer would have particular use in applications where the risk of fire or extended temperatures might be feared to destroy the pipe and flange linings since these are often fabricated from rubber or plastic material.

According to one aspect, the flange spacer comprises a perimeter spacer ring having an inner diameter equal to an outer diameter of the annular shoulder. According to another aspect, the fluid control assembly is for connection to a pipe flange and the perimeter spacer ring has an outer diameter equal to an outer diameter of the pipe flange, such that the ring allows the fluid control device to be easily and properly aligned with the pipe flange.

According to an additional aspect, the main body of the fluid control device includes bolt holes passing therethrough and the perimeter spacer ring has bolt openings corresponding to the bolt holes of the fluid control device. According to a further aspect, the fluid control assembly further includes bolts for securing the fluid control assembly to a pipe flange, and a liveload assembly positioned on each bolt for preventing bolt creep and maintaining clamping pressure on the flanges. Each liveload assembly includes an upper washer, a lower washer, and at least one spring positioned to resist compression between the upper and the lower washers.

According to still another aspect, the liveload assemblies also include a ribbon secured at a first end to one of the upper and the lower washers, with a second end of the ribbon extending towards the other of the upper and the lower washers. The ribbon has a total length, including a comparison portion substantially equal to a proper compressed height of the at least one spring, with only the comparison portion of the total length positioned between the upper and the lower washers for comparison with the height of the spring.

BRIEF DESCRIPTION OF THE DRAWINGS

So that those having ordinary skill in the art to which this disclosure pertains will more readily understand how to construct a fluid control assembly in accordance with this disclosure, preferred embodiments of the fluid control assemblies will be described in detail herein below with reference to the drawings wherein.

DETAILED DESCRIPTION

Figure 1:
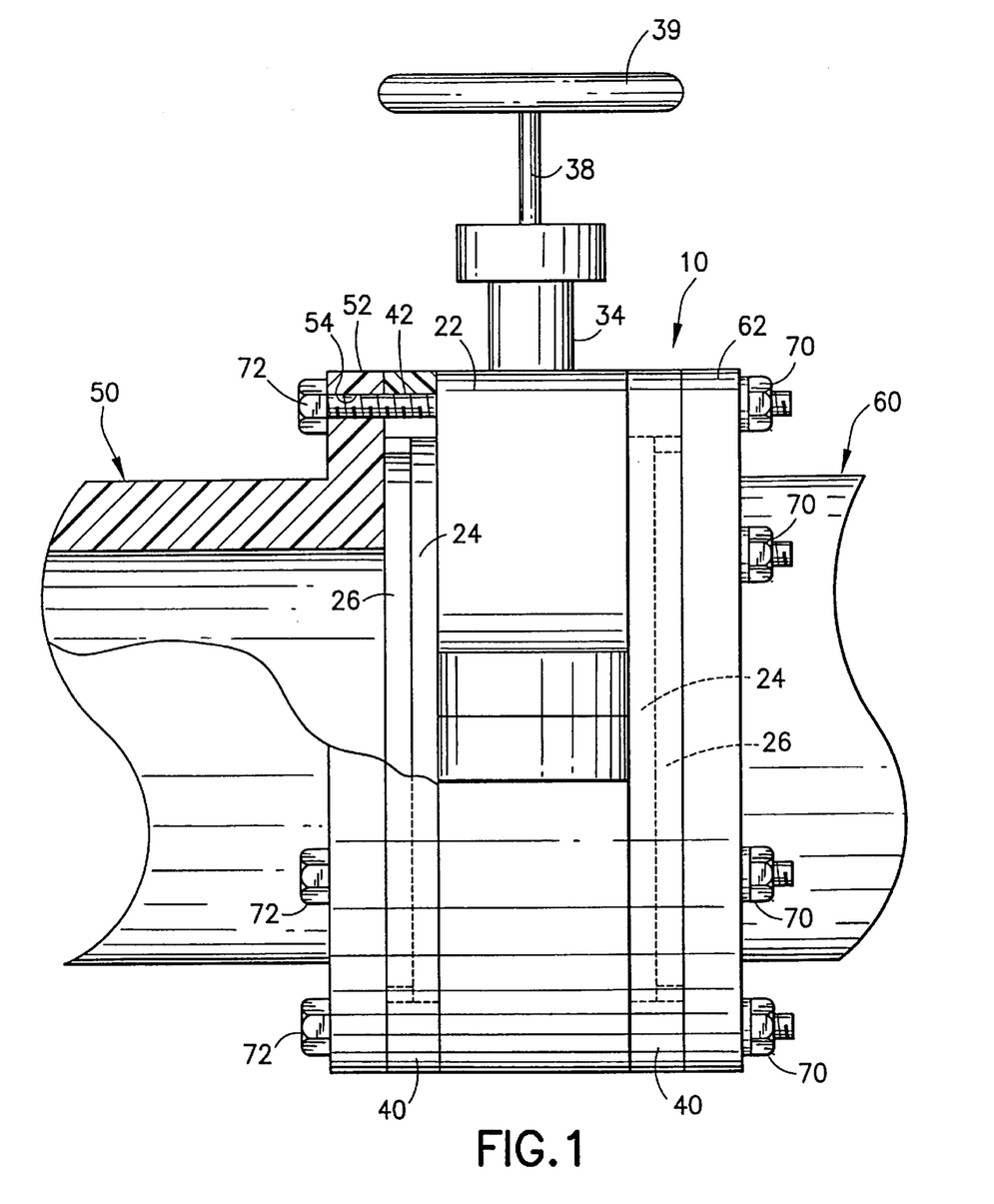
FIG. 1 shows a side elevation view, partially in section, of a fluid control assembly according to the present disclosure, secured between two pipe flanges.
Figure 2:
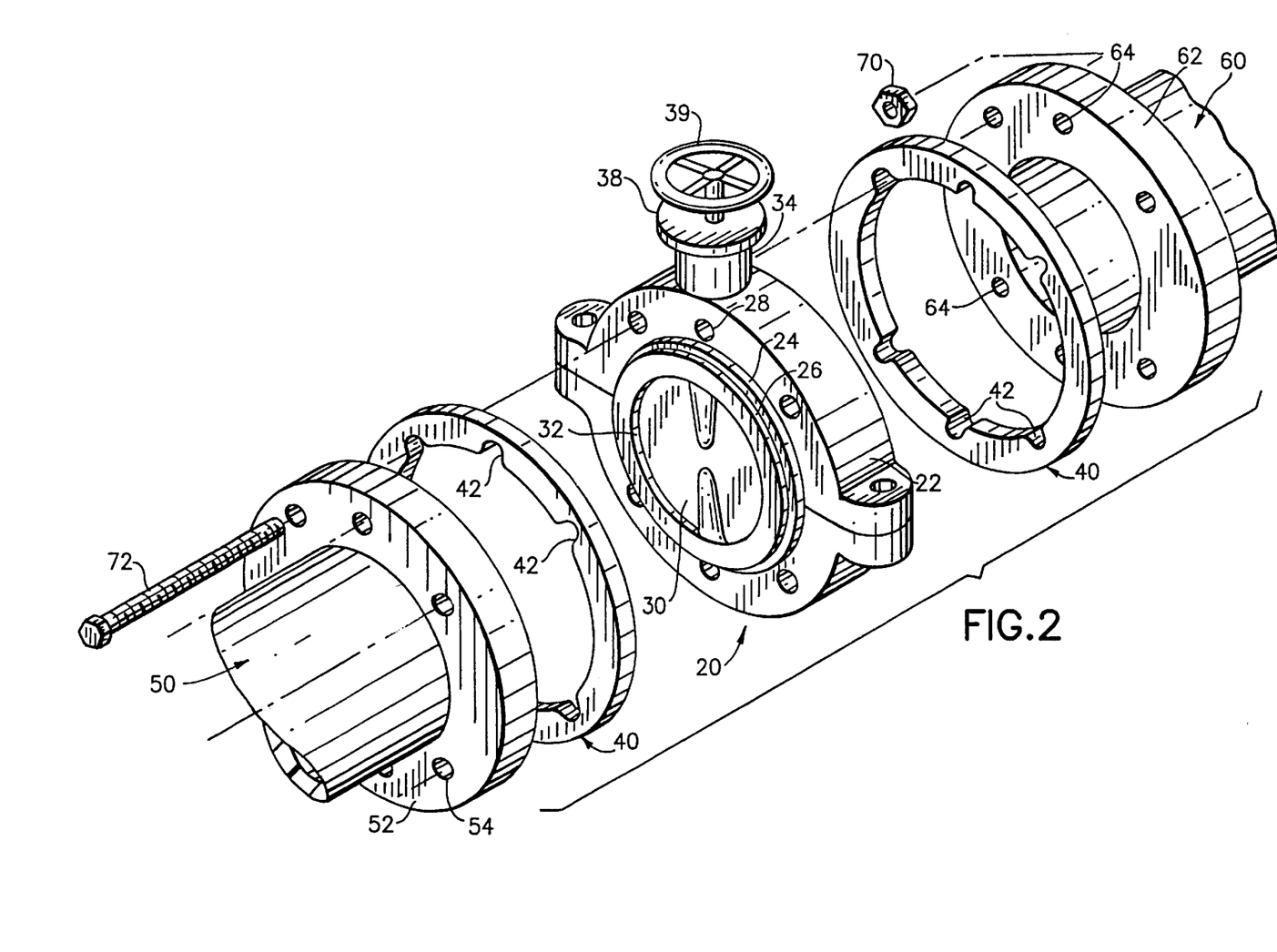
FIG. 2 shows an exploded isometric view of the fluid flow assembly and pipe flanges of FIG. 1.
Figure 3:
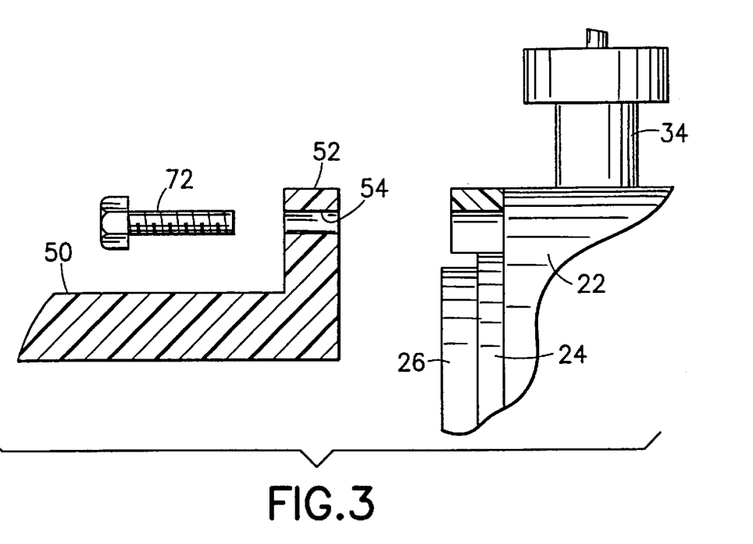
FIG. 3 shows a side elevation view, partially in section, of portions of one of the pipe flanges and the fluid control assembly of FIG. 1.

Referring to FIGS. 1 through 3, a fluid control assembly 10 disclosed herein includes a fluid control device 20 having a main body 22 defining a fluid passageway and annular shoulders 24 extending from opposite sides of the main body in alignment with the passageway. The device 20 also includes a tubular, relatively compressible liner 26 positioned in the passageway and extending out of opposite sides of the body 22, through and just axially beyond the annular shoulders 24. The assembly 10 further has relatively non-compressible flange spacers 40 positioned on the shoulders 24 of the fluid control device 20.

Figure 4:
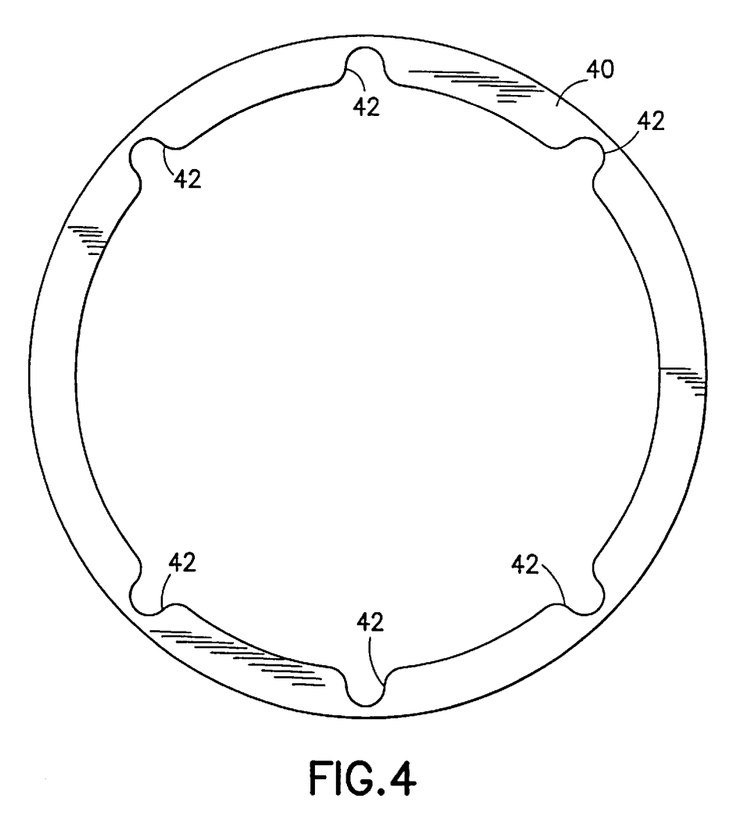
FIG. 4 shows a front elevation view of a flange spacer of the fluid control assembly of FIG. 1.
Figure 4A:
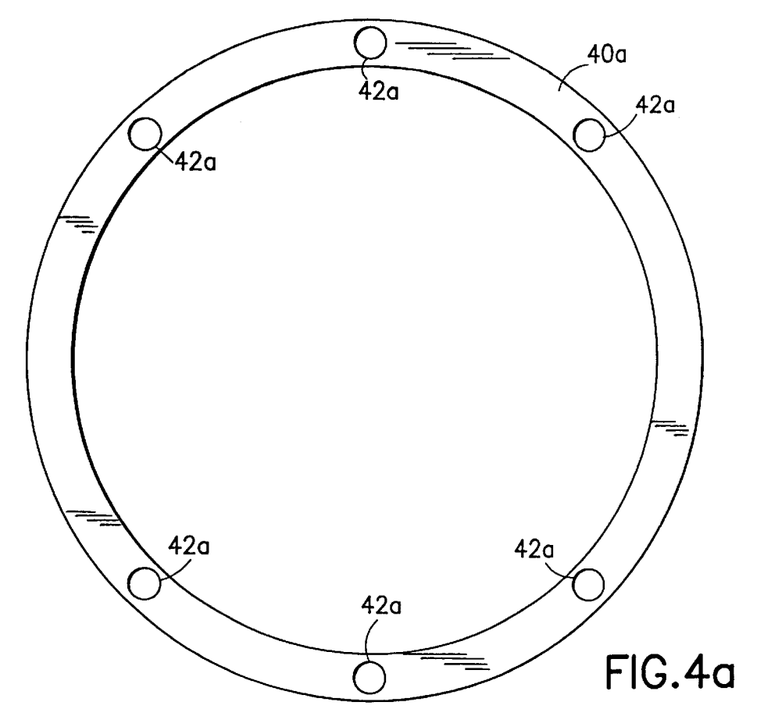
FIG. 4a shows a front elevation view of another flange spacer of the fluid control assembly of FIG. 1.

In the particular embodiment shown, the fluid control device comprises a butterfly valve 30 for being secured between flanges 52, 62 of two pipes 50, 60 with a plurality of fasteners. The fasteners can comprise nuts 72 and bolts 70. The bolts 70 extend through bolt holes 54, 64 in the flanges 52, 62 and bolt holes 28 in the main body 22 of the valve 20 and are fastened with the nuts 72 to clamp the valve between the pipe flanges in a fluidtight manner. Referring also to FIG. 4, when the fasteners are provided in the form of nuts 72 and bolts 70, the flange spacers 40 each include a plurality of openings 42 corresponding to the bolt holes 54, 64 in the flanges 52, 62 and bolt holes 28 in the valve 20, for allowing the bolts 70 to pass therethrough.

The relatively compressible liner 26 is preferably comprised of PTFE, while each flange spacer 40 is made of a rigid, relatively non-compressible and non-corrosive material, for instance a metal, such as stainless steel or aluminum, or a plastic, such as PVC or polypropelene. By relatively compressible and relatively non-compressible, it is meant that the flange spacers 40 are relatively non-compressible with respect to the liner 26. Each flange spacer 40 has a predetermined thickness such that the flange spacers extend further from the main body 22 of the valve 20 than the shoulders 24, but less than the liner 26 when the liner is not compressed, as best shown in FIG. 3. Thus, when the valve 20 is secured between the pipes flanges 52, 62, the flange spacers 40 prevent the flanges from bending towards each other, or "rotating", when the bolts 70 are tightened, thereby substantially eliminating uneven stresses on the pipe flanges. However, the flange spacers 40 allow the liner 26 to be compressed, but not over-compressed, such that the compressed liner provides a fluid-tight seal between the valve 20 and the pipes 50, 60, yet does not interfere with movement of a valve element 30 within a fluid passageway 32 of the valve 20.

Unless otherwise noted, terms such as "radial," "longitudinal," "axial," etc. will be used herein with reference to the centerline of the fluid passageway 32 of the valve 20. The disc-like valve element 30, which is preferably coated with PTFE, is rotatably mounted in the fluid passageway 32 for rotation about an axis which extends diametrically across the fluid passageway 32, specifically through the centerline of the boss 34 of the valve body 22. A valve stem 38 is attached to valve element 30, extends through a boss 34, and can be engaged by suitable actuator means or by a hand operated handle 39 or the like to rotate the valve element between a closed valve position, in which it extends transversely across the fluid passageway 32, and an open valve position, in which it extends generally along the fluid passageway axis. In the latter position, the valve element 30 extends axially out of the main body 22. Thus, the fluid passageway 32 must be in substantial register with the pipes 50, 60 to prevent the valve element 30 from jamming against the flanges 52, 62 when moved from its closed valve position to its open valve position.

The flange spacers 40 can be provided in the form of a perimeter spacer rings, as shown best in FIG. 4. Preferably, the perimeter spacer rings have an inner diameter equal to outer diameters of the shoulders 24 and an outer diameter equal to outer diameters of the pipe flanges 52, 62, such that the rings allow the valve 20 to be easily and properly aligned with the pipe flanges. The perimeter spacer rings also allow the valve 20 to be properly aligned with the pipe flanges 52, 62 such that the valve element 30 within the fluid passageway 32 of the valve 20 does not contact either of the pipes 50, 60 and become damaged when opened and closed. As shown, the bolt openings of the perimeter spacer rings 40 are provided in the form of notches 42.

Figure 4B:
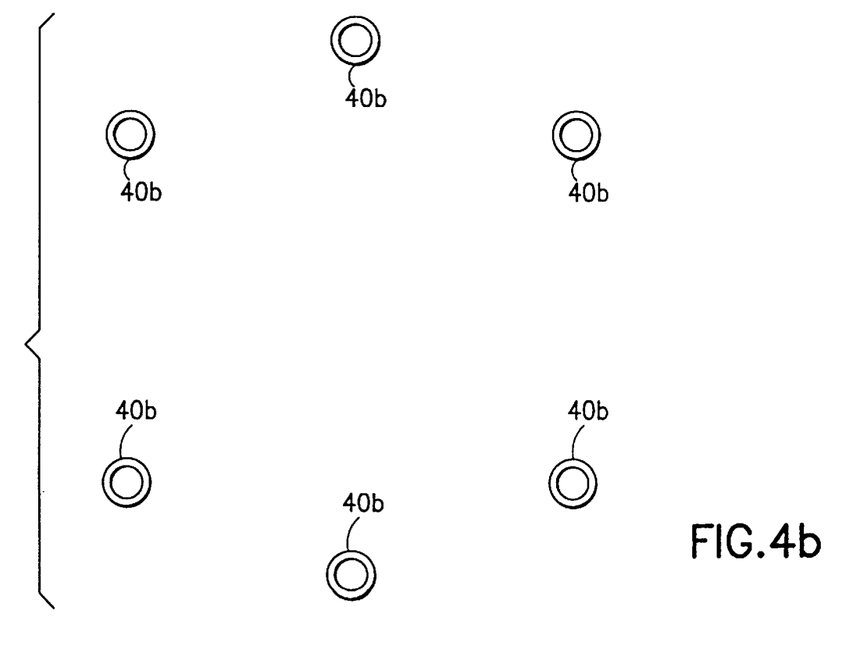
FIG. 4b shows a front elevation view of additional flange spacers of the fluid control assembly of FIG. 1.

It should be understood that the flange spacers 40 can be provided in many forms. For example, the flange spacers can be provided in the form of perimeter spacer rings 40a, similar to the perimeter spacer rings of FIG. 4, but wherein the bolt openings of the perimeter spacer rings 40a are provided in the form of holes 42a, as shown best in FIG. 4. The flange spacers 40 can additionally be provided in the form of a multiplicity of washers 40b placed in a pattern along the shoulder diameter, as shown in FIG. 4b.

Figure 5:
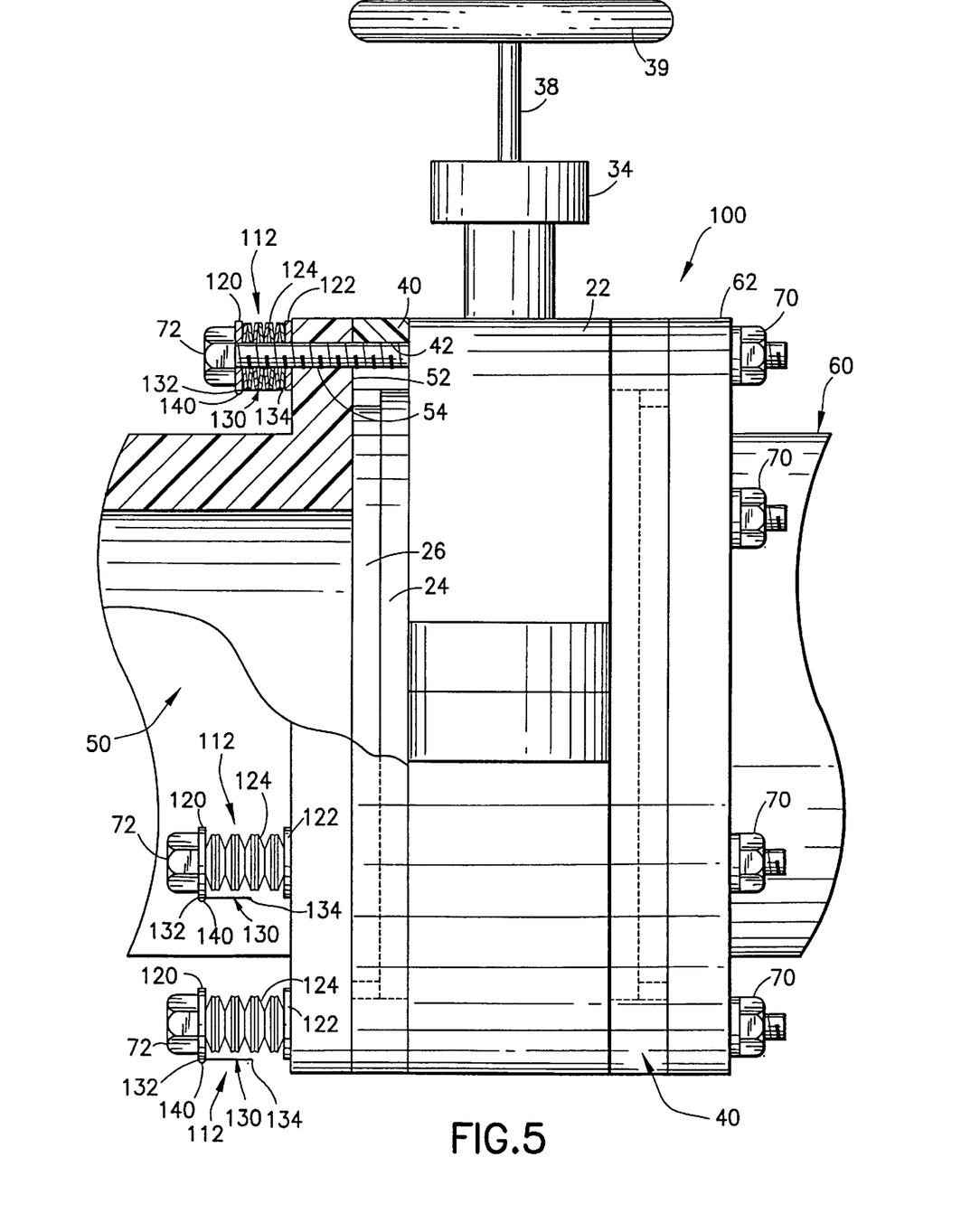
FIG. 5 shows a side elevation view, partially in section, of another fluid control assembly according to the present disclosure, secured between two pipe flanges.

Referring to FIG. 5, another fluid control assembly 100 according to the present disclosure is shown. The assembly 100 of FIG. 5 is similar to the assembly 10 of FIGS. 1 through 3, but each bolt 72 is provided with a liveload assembly 112 for maintaining proper compression on the flanges 52, 52 during the life of the assembly 100.

Each liveload assembly 112 includes an outer washer 120, an inner washer 122, and at least one spring 124 positioned to resist compression between the outer and the inner washers. Each liveload assembly 112 also includes a compression indicator 110 that provides a visual indication of a proper compressed height, or deflection, of the assembly 112. The indicator includes a ribbon 130 and a ribbon fastener 140. The ribbon fastener 140 secures a first end 132 of the ribbon 130 to the outer washer 120, and a second end 134 of the ribbon 130 extends towards the inner washer 122. The ribbon 130 has an overall length including a comparison portion L between the outer and the inner washers 120, 122 equal to a proper compressed height of the spring 124.

Preferably, the ribbon fastener is provided in the form of a screw 140 that extends through a hole in the first end 132 of the ribbon 130 and is threadingly received in a threaded bore in a side surface of the outer washer 120. Alternatively, however, the ribbon fastener could simply comprise a spot-weld or adhesive, for example, or another suitable type of fastener between the ribbon 130 and the outer washer 120.

The ribbon 130 is preferably elongated and rigid, and made of metal or plastic, for example. In addition, the ribbon 130 is preferably provided in a bright color, such as fluorescent orange for example, to enhance seeing the ribbon and comparing the ribbon to the spring 124. Furthermore, the ribbon 130 preferably has English or metric length measurement markings such that its actual length can be easily determined.

The outer and the inner washers 120, 122 of the assembly 112 are preferably flat washers, while the at least one spring is preferably a plurality of cupped disc spring washers 124. It should be appreciated, however, that the at least one spring could comprise a helical coil or other suitably resilient article for resisting compression. In addition, the outer and the inner washers and the at least one spring can all be provided as cupped disc spring washers.

Cupped disc spring washers 124 are commonly referred to as "Belleville washers." The Belleville washers 124 are conical rings which flatten when compressed under force. Manufacturers of Belleville washers provide specifications showing the dimensions of the washers and the load carried by the washer under compression at specified percent deflection. The specifications are used to select Belleville washers for maintaining torque for a particular installation, as discussed below. Preferably, Belleville washers 124 with linear regressive load deflections are incorporated, since such washers provide a direct correlation between the compression and deflection. Other types of Belleville washers will work with the compression indicator 110 disclosed, but to equate deflection to compression requires reference to other formulas or the manufacturer's spring table specifications.

A representative method for liveloading the flanges includes first calculating the length L of the ribbon 130 between the outer and the inner washers 120, 122. This length L is based upon the number and type of Belleville washers 124 selected for the particular application. Specifically, the length L is equal to the total height of the stack of Belleville washers 124 at between 25% and 75% deflection. Most preferably, the length L of the ribbon 130 between the outer and the inner washers 120, 122 is equal to the total height of the stack of Belleville washers 124 at about 75% deflection, since deflections approaching about 101% over-stress the washers, while deflections below about 25% do not provide sufficient force to ensure a fluid tight seal.

Thus, the comparison portion L of the total length of the ribbon 130 is calculated using the number of Belleville washers 124, the height of each washer in an uncompressed state, and the reduction in height of each washer at 75% deflection. For example, the comparison portion L of the ribbon 130 between the outer and the inner washers 120, 122, or the proper compressed height of the Belleville washers 124, is computed as follows:

$$L=n(H-h)$$

Wherein, L is the comparison portion of the ribbon 130 between the outer and the inner washers 120, 122, n is the total number of Belleville washers 124, H is the height of one Belleville washer 124 prior to compression, and h is the reduction in height of the Belleville washer 124 when compressed to about 75% deflection.

Once the comparison portion L of the length of the ribbon 130 is determined, the ribbon can be cut to size and secured to the outer washer 120 of the liveload assembly. In the embodiment shown, the total length of the ribbon 130 includes the comparison portion L plus an additional portion for securing the first end 132 of the ribbon to the outer washer 120. Then each of the liveload assemblies 112 are positioned on one of the bolts 72 and the bolt is tightened until the second end 134 of the ribbon 130 is equal with the inner washer 122, and, more preferably, until the second end of the ribbon is contiguous with an outwardly facing surface of the inner washer 122.

Any future loosening of the bolts 72 causes the deflection, or compression, of the Belleville washers 124 to decrease such that the outer washer 120 and the attached ribbon 130 move axially away from the inner washer 122 of each liveload assembly 112. The position of the second end 134 of the ribbon 130 with respect to the inner washer 122 permits visual monitoring of the load provided by the liveload assembly 112. Thus, when the second end 134 of the ribbon 130 moves away from the inner washer 122, the bolts 72 should be further tightened to recompress the Belleville washers 124 until the second end 134 of the ribbon 130 is once again even with the outwardly facing surface of the inner washer 122, so that the Belleville washers are properly compressed.

Figure 6:
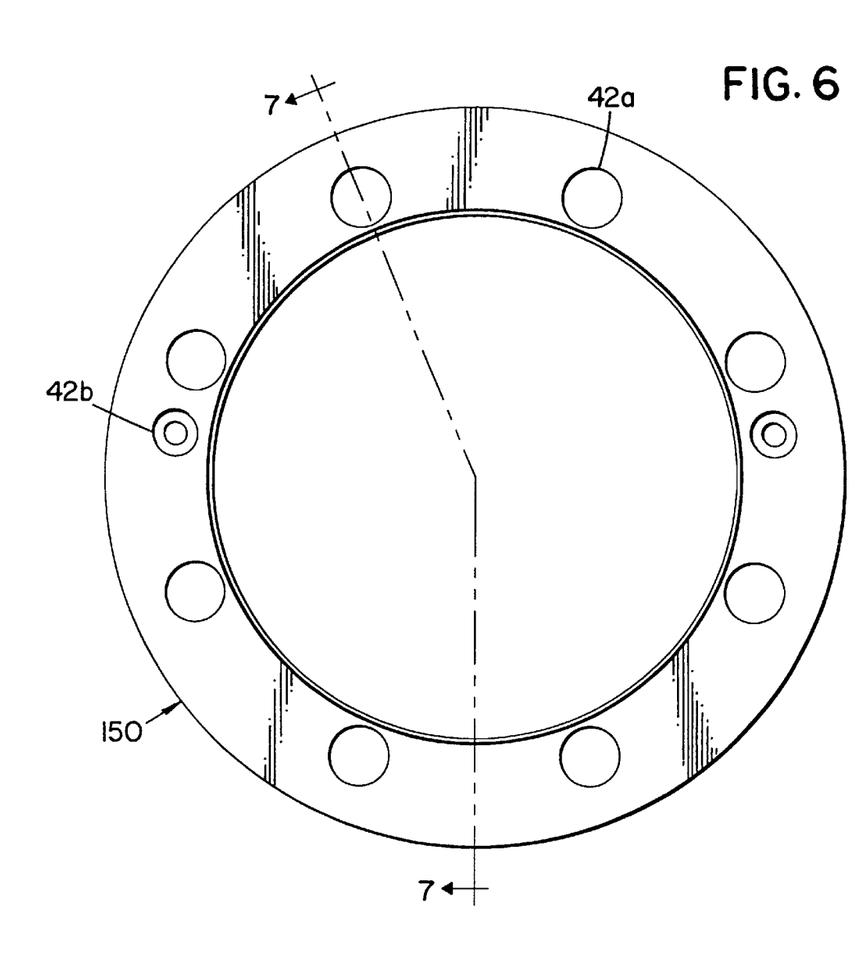
FIG. 6 shows a front elevation view of a tri-layer composite flange spacer.

Referring now to FIG. 6, there is shown a front elevation view of an alternative flange spacer 150 which includes three layers of material. The tri-layer composite flange spacer 150 includes a number of equally spaced holes 42a and one or more countersunk holes 42b facilitating assembly of the composite flange spacer 150 to pipe and valve flanges.

Figure 7:
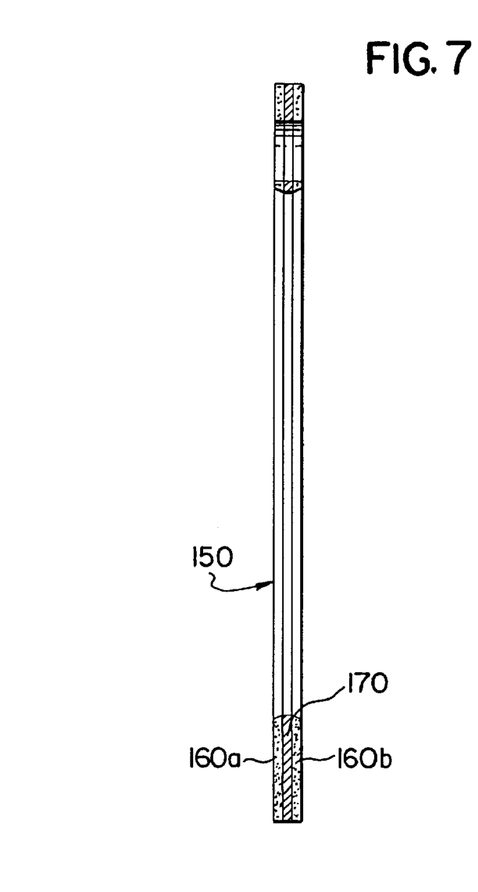
FIG. 7 shows a cross-sectional side elevation view of a tri-layer composite flange spacer.

Referring to FIG. 7, there is shown a cross-sectional side elevation view of the tri-layer composite flange spacer 150 shown in FIG. 6. Composite flange spacer 150 comprises two compressible fire resistant layers 160a and 160b that sandwich a relatively non-compressible layer 170. In a preferred embodiment, compressible fire-resistant layers 160a and 160b are of similar composition. A preferred composition is flexible graphite. Non-compressible layer 170 may be composed of any relatively non-compressible material including, for example, carbon steel.

Figure 8:
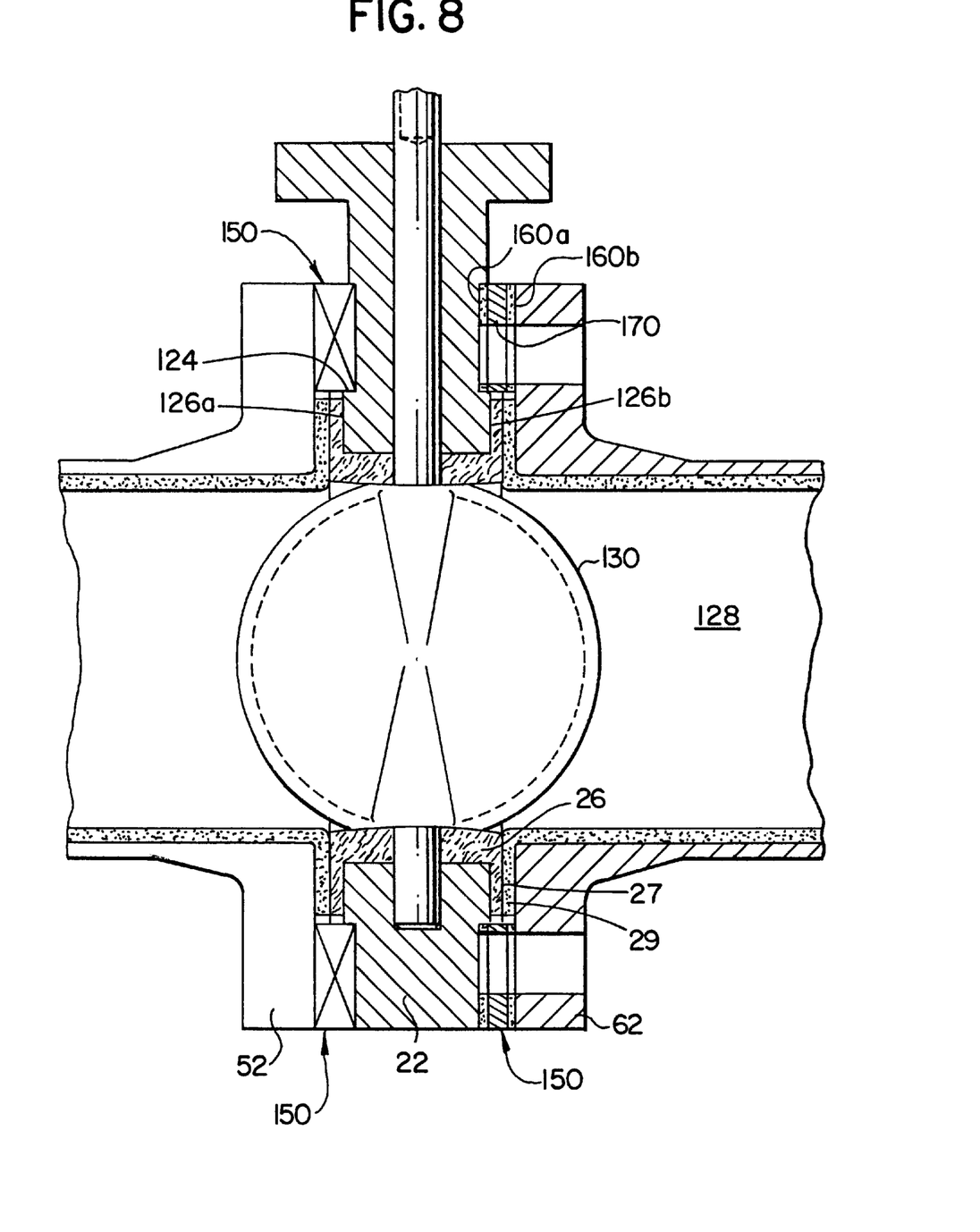
FIG. 8 shows a cross-sectional side elevation view of a tri-layer composite flange spacer assembled between a fluid control assembly and two pipe flanges.

Referring to FIG. 8, there is shown a cross-sectional side elevation view of the tri-layer composite flange spacer 150 assembled between the body 22 of a fluid control assembly and two pipe flanges 52, 62.

The fluid control assembly includes a valve body 22 and two tri-layer composite flange spacers 150. The valve body 22 includes front surface 126a, back surface 126b and flow-way 128 which extends between the front and back surfaces, 126a and 126b, respectively. A valve element 130 is mounted in flow-way 128 and moves from a first position which closes flow-way 128 to a second position which opens flow-way 128. Shoulders 124 extend about 128 flow-way from the front and back surfaces, 126a and 126b, respectively of the valve body 22. A relatively compressible liner 26 lines flow-way 128 and the front and back surfaces, 126a and 126b, respectively.

Tri-layer composite flange spacers 150 are positioned about the shoulders 124 and extend from the front surface 126a and the back surface 126b of the valve body 22 to a position radially outward of and exterior to an end 27 of the liner 26 which extends beyond the front and back surfaces, 126a and 126b, respectively. In the embodiment shown herein, composite flange spacers 150 have an inside diameter which is equal to an outside diameter of shoulders 124.

With continuing reference to FIG. 8, the flange spacers 150 provide a companion ring that is inserted between pipe flanges 52 and 62 and the valve body 22. When the flange joint is drawn tight a second seal is developed across the valve body 22 and mating pipe flanges 52 and 62. The second seal functions to complement the seal created by the plastic pipe liner 29 and valve liner 26. In the event of a fire, the flammable plastic valve liner 26 and pipe liner 29 will burn or disintegrate leaving the fire resistant flange spacers 150 (companion rings) in place to provide a seal across the flange joint.

The principles, preferred embodiments and modes of operation of the presently disclosed fluid control assemblies have been described in the foregoing specification. The disclosed fluid control assemblies, however, are not to be construed as limited to the particular embodiments shown, as these embodiments are regarded as illustrious rather than restrictive. Moreover, variations and changes may be made by those skilled in the art without departing from the spirit of the presently disclosed fluid control assemblies.

What is claimed is:

1. A fluid control assembly comprising:

a) a valve body having a front surface and a back surface, a flow-way extending through said valve body from said front surface to said back surface, a valve element mounted in said flow-way for movement from a first position closing said flow-way to a second position opening said flow-way, at least one shoulder extending about said flow-way from at least one of said front and back surfaces of said valve body, and a relatively compressible liner lining said flow-way and extending beyond at least one of said front and back surfaces; and b) at least one flange spacer positioned about said shoulder(s), said spacer(s) extending from at least one of said front surface and back surface of said valve body to a position radially outward of and exterior to an end of said liner extending beyond said front and back surfaces and including a fire-resistant relatively non-compressible layer sandwiched between a pair of fire-resistant compressible layers.

2. A fluid control assembly as recited in claim 1, wherein said at least one flange spacer includes a radially inner dimension substantially equal to a radially outer dimension of said shoulder(s).

3. A fluid control assembly as recited in claim 1, wherein said fire-resistant relatively non-compressible layer is carbon steel.

4. A fluid control assembly as recited in claim 1, wherein said pair of fire-resistant relatively compressible layers are flexible graphite.

5. A fluid control assembly as recited in claim 1, wherein said valve element is a butterfly valve element.

6. A fluid control assembly as recited in claim 1, wherein said relatively compressible liner lining said flow-way and extending beyond at least one of said front and back surfaces is polytetrafluorethylene.

* * * * *